United States Patent
Farley et al.

(10) Patent No.: US 6,956,088 B2
(45) Date of Patent: Oct. 18, 2005

(54) POLYETHYLENE FILMS WITH IMPROVED PHYSICAL PROPERTIES

(75) Inventors: James McLeod Farley, League City, TX (US); John F. Szul, Nitro, WV (US); Matthew Gary McKee, Blacksburg, VA (US)

(73) Assignee: Univation Technologies, LLC, Houston, TX (US)

( * ) Notice: Subject to any disclaimer, the term of this patent is extended or adjusted under 35 U.S.C. 154(b) by 22 days.

(21) Appl. No.: 10/199,446

(22) Filed: Jul. 19, 2002

(65) Prior Publication Data
US 2003/0096128 A1 May 22, 2003

Related U.S. Application Data
(60) Provisional application No. 60/306,600, filed on Jul. 19, 2001.

(51) Int. Cl.[7] .......................... C08F 4/06; C08F 210/14; B32B 27/32; B29C 47/88
(52) U.S. Cl. .................. 526/113; 526/348; 526/348.1; 526/348.5; 526/943; 428/212; 428/220; 428/523; 428/910; 264/176.1; 264/209.5; 264/211.2
(58) Field of Search ................. 526/113, 114, 526/118, 119, 160, 943, 907; 428/500, 220, 910, 523, 212; 264/176.1, 209.5, 211.2

(56) References Cited

U.S. PATENT DOCUMENTS

| | | | | |
|---|---|---|---|---|
| 3,721,269 A | * | 3/1973 | Choate et al. | 138/119 |
| 3,966,378 A | * | 6/1976 | Valyi | 425/150 |
| 4,226,905 A | * | 10/1980 | Harbourne | 428/220 |
| 4,303,710 A | * | 12/1981 | Bullard et al. | 383/116 |
| 4,692,496 A | * | 9/1987 | Bahl et al. | 525/240 |
| 5,093,189 A | * | 3/1992 | Yamawaki | 428/220 |
| 5,256,359 A | * | 10/1993 | Hahm | 264/211.12 |

(Continued)

FOREIGN PATENT DOCUMENTS

| | | |
|---|---|---|
| EP | 0 664 301 A1 | 7/1995 |
| EP | 0 511 665 B1 | 7/1998 |
| FR | 09716011 * | 3/1999 |
| JP | 59114029 * | 7/1984 |
| JP | 61179738 * | 8/1986 |
| JP | 2001254282 * | 3/2003 |
| WO | WO 84/02707 | 7/1984 |
| WO | WO 97/44371 | 11/1997 |
| WO | WO 98/28350 | 7/1998 |
| WO | WO 99/65957 | 12/1999 |
| WO | WO 00/31088 | 6/2000 |

OTHER PUBLICATIONS

ASTM D 1922–03a*
ANTEC 2003 Plastic: Annual Technical Conference, vol. 2; S. Elkoun, "Effect of Processing Parameters on Properties of LLDPE–based mono– and multi–layered blown films" pp. 1381–1385.*
ANTEC 1003 Plastic: Annual Technical Conference, vol 1, H.Y. Chen, "Orientation and Property Corelation on LLDPE Blwon Films" pp. 1401–1405.*

(Continued)

Primary Examiner—Kevin R. Kruer
(74) Attorney, Agent, or Firm—Kevin M. Faulkner (57) ABSTRACT

Metallocene catalyzed polyethylenes are found to have improved physical properties, improved processability and improved balance of properties. Surprisingly, there is a direct relationship between MD shrinkage, and MD tear. Additionally, MD tear is greater than TD tear, and MD tear is also greater than intrinsic tear. MD tear to TD tear ratios are above 0.9, and dart drop impact is above 500 g/mil. The polyethylenes have a relatively broad composition distribution and relatively broad molecular weight distribution.

58 Claims, 1 Drawing Sheet

U.S. PATENT DOCUMENTS

| | | | | |
|---|---|---|---|---|
| 5,317,036 A | * | 5/1994 | Brady et al. | 523/223 |
| 5,359,015 A | | 10/1994 | Jejelowo | 526/114 |
| 5,382,630 A | | 1/1995 | Stehling et al. | 525/240 |
| 5,382,631 A | | 1/1995 | Stehling et al. | 525/240 |
| 5,525,689 A | | 6/1996 | Tsutsui et al. | 526/160 |
| 5,608,019 A | | 3/1997 | Cheruvu et al. | 526/129 |
| 5,635,262 A | * | 6/1997 | Best et al. | 428/36.92 |
| 5,679,812 A | | 10/1997 | Winter et al. | 556/7 |
| 5,786,495 A | | 7/1998 | Resconi et al. | 556/11 |
| 5,874,513 A | | 2/1999 | Watanabe et al. | 526/348.1 |
| 5,886,202 A | | 3/1999 | Jung et al. | 556/11 |
| 5,904,964 A | * | 5/1999 | Snyder | 428/35.1 |
| 5,929,264 A | | 7/1999 | Rohrmann et al. | 556/11 |
| 5,990,253 A | | 11/1999 | van Beck et al. | 526/127 |
| 6,051,728 A | | 4/2000 | Resconi et al. | 556/53 |
| 6,111,019 A | | 8/2000 | Arjunan et al. | 525/211 |
| 6,214,469 B1 | | 4/2001 | Sukhadia et al. | 428/421 |
| 6,248,845 B1 | | 6/2001 | Loveday et al. | 526/113 |
| 6,340,532 B1 | | 1/2002 | Huang et al. | 428/523 |
| 6,355,733 B1 | * | 3/2002 | Williams et al. | 525/191 |
| 6,437,047 B1 | * | 8/2002 | Cecchin et al. | 525/191 |
| 6,441,116 B1 | | 8/2002 | Shikuma et al. | 526/348 |
| 6,469,103 B1 | * | 10/2002 | Jain et al. | 525/240 |
| 6,613,841 B2 | * | 9/2003 | Williams | 525/191 |

OTHER PUBLICATIONS

Angew. Chem. 101 (1989) No. 11, 1536 Herrman, et al.

ASTM 1922–03, *Standard Test Method for Propagation Tear Resistance of Plastic Film and Thin Sheeting by Pendulum Method.*

Patel, Rajen et al., *"Investigation of Processing–Structure–Properties Relationships in Polyethylene Blown Films"* Polymer Engineering and Science, Mid–Oct. 1994, vol. 34, No. 19, 1506–1514.

Krishnaswamy, R.K., et al., *"Orientation characteristics of LLDPE blown films and their implication on Elmendorf tear performance"* Polymer 41 (2000) 9205–9217.

EXCEED Polyethylene 1018 Data Sheet, ExxonMobil Chemical Co. (Oct. 2003).

ELITE 5400 Polyethylene Data Sheet, Dow Chemical Co. (1996–2003).

* cited by examiner

FIG. 1

POLYETHYLENE FILMS WITH IMPROVED PHYSICAL PROPERTIES

This application claims the benefit of Provisional application Ser. No. 60/306,600, filed Jul. 19, 2001.

TECHNICAL FIELD

The present invention relates to films that exhibit a superior balance of physical properties, and a metallocene catalyzed polyethylene used to make the films that is easier to process than previous metallocene catalyst produced polyolefins and/or polyethylenes. The films are produced with polyethylenes having a relatively broad composition distribution (CD) and a relatively broad molecular weight distribution (MWD).

BACKGROUND

Metallocene-catalyzed ethylene inter-polymers are known, which have improved processing and film properties, such as dart drop impact strength (dart). However, none of the existing body of knowledge achieves the balance of physical properties, the molecular properties and ease of processing discussed herein. Conventional Ziegler-Natta catalyzed linear low density polyethylene (Z-N LLDPE) is known to have good stiffness, as expressed by 1% secant modulus, and good Elmendorf tear strength.

However, conventional knowledge in the polyethylene film art is that by increasing the machine direction orientation (MD) in films during manufacture of these films, physical properties, such as MD tear strength, will decrease.

To this point, in *Polymer Engineering and Science*, mid-October 1994, vol. 34, No. 19, the disclosure of which is incorporated herein by reference, the authors discuss processing structure properties relationships in polyethylene blown film. The authors suggest that MD Elmendorf tear is found to be inversely related to drawdown ratio and MD shrinkage.

Further, in *Polymer*, 41 (2000) 9205–9217, the disclosure of which is incorporated herein by reference, the authors suggest that at high MD extension rates, a greater number of molecules will be oriented along the MD prior to the onset of crystallization, and that this is detrimental from a MD tear performance perspective.

Metallocene catalyst components can be combined to form blend compositions as described in PCT publication WO 90/03414 published Apr. 5, 1990, the disclosure of which is incorporated herein by reference. Also mixed metallocenes as described in U.S. Pat. Nos. 4,937,299 and 4,935,474, the disclosure of both which are incorporated herein by reference, can be used to produce polymers having a broad molecular weight distribution and/or a multimodal molecular weight distribution.

U.S. Pat. No. 5,514,455 suggests that a reduction in gauge of polyethylene films results in an increase in tear values. This document employs a titanium magnesium catalyst for polyethylene production and includes titanium residues in the polyethylene. Reported values of Elmendorf machine direction (MD) tear to transverse direction (TD) tear, are in the range of 0.1–0.3 for inventive examples.

U.S. Pat. No. 5,744,551, the disclosure of which is incorporated herein by reference, suggests a balance of tear property improvement. This document also employs a titanium magnesium catalyst for polyethylene production and includes titanium residues in the polyethylene. Further, the MD/TD tear ratios are in the range of 0.63–0.80 for inventive examples.

U.S. Pat. No. 5,382,630, the disclosure of which is incorporated herein by reference, discloses linear ethylene interpolymer blends made from components that can have the same molecular weight but different comonomer contents, or the same comonomer contents but different molecular weights, or comonomer contents which increase with molecular weight. U.S. Pat. No. 5,382,630 suggests multimodal polyethylene blends for which tear strength can be controlled. However, this document uses only intrinsic tear, and is silent on Elmendorf MD/TD tear ratios and on any other values but intrinsic tear.

Also, in U.S. Pat. No. 6,242,545 and U.S. Pat. No. 6,248,845 as well as provisional applications U.S. Ser. No. 60/306,503 filed Jul. 19, 2001 and 60/306,903 filed Jul. 19, 2001, the disclosures of all which are incorporated herein by reference, the patentees/applicants of these documents reported production of either broad composition distribution, narrow molecular weight, or broad composition distribution, relatively broad molecular weight distribution polyethylenes. However, these documents show an improvement in cast film MD tear, but no appreciable improvement for blown film.

There is a commercial need therefore for a polyolefin film, more specifically a blown polyethylene film, that has high machine direction tear (MD tear) and/or high transverse direction tear (TD tear), and/or high dart drop impact resistance (dart), made from a polyethylene that is easier to process than prior metallocene catalyst produced linear low density polyethylenes (mLLDPE). In other words it is desirable to have the processability, stiffness and tear strength of a ZN-LLDPE combined with the dart impact strength of a mLLDPE.

SUMMARY

Surprisingly, we have now discovered that films exhibiting such improved physical properties are the result of a polyethylene that is produced in a single reactor, with a substantially single catalyst. Such improved physical properties are unexpected and surprising. Furthermore, the MD tear strength of these films can be increased by increasing the MD orientation of these films during their manufacture, which is also unexpected and surprising.

We contemplate a film, comprising a linear low density polyethylene (LLDPE), wherein the film has a ratio of MD tear to TD tear, both determined by ASTM D 1922, of $\geq 0.9$, or $\geq 1.0$, or $\geq 1.1$, or $\geq 1.2$, or $\geq 1.3$.

In another embodiment we contemplate that such films will have an MD tear $\geq 350$ g/mil, and a dart drop impact, as determined by ASTM D-1709 $\geq 500$ g/mil. We further contemplate a process for producing such films by extruding an LLDPE at a temperature effective to produce a film having an MD tear $\geq 350$ g/mil.

Also contemplated is a process for producing these films by extruding the film of an LLDPE at a drawdown ratio effective to produce a film having an MD tear $\geq 350$ g/mil.

Additional embodiments include: a polyolefin film, comprising an LLDPE extruded at a temperature, or a drawdown ratio effective to form a film having a MD tear to TD tear ratio $\geq 1.0$, wherein the film has a MD tear $\geq 450$ g/mil and a dart drop impact $\geq 500$ g/mil. Contemplated as well is a film having a balance of physical properties, comprising an LLDPE, wherein the film has a ratio of MD tear to TD tear, as measured by ASTM D 1922, of $\geq 1.0$, and a MD tear $\geq 400$ g/mil, and a dart drop impact, as measured by ASTM D-1709 $\geq 500$ g/mil. Further, we contemplate a polyethylene film, comprising: an LLDPE, the film having an MD tear $\geq 500$ g/mil, and an MD shrinkage $\geq 70\%$.

Also contemplated is a polyethylene film, comprising an LLDPE, wherein the film has a direct relationship between MD tear and MD shrinkage or draw-down ratio.

We further contemplate a LLDPE having a molecular weight distribution, in the range of from 2.5–7, and a broad, polymodal composition distribution, the composition distribution breadth index (CDBI) generally ≦55%, as determined by crystallization analysis fractionation (CRYSTAF).

BRIEF DESCRIPTION OF THE DRAWING

These and other features, aspects and advantages of embodiments of our invention, will become better understood with reference to following description, appended claims, and the accompanying drawing, in which:

DETAILED DESCRIPTION

Figure 1:
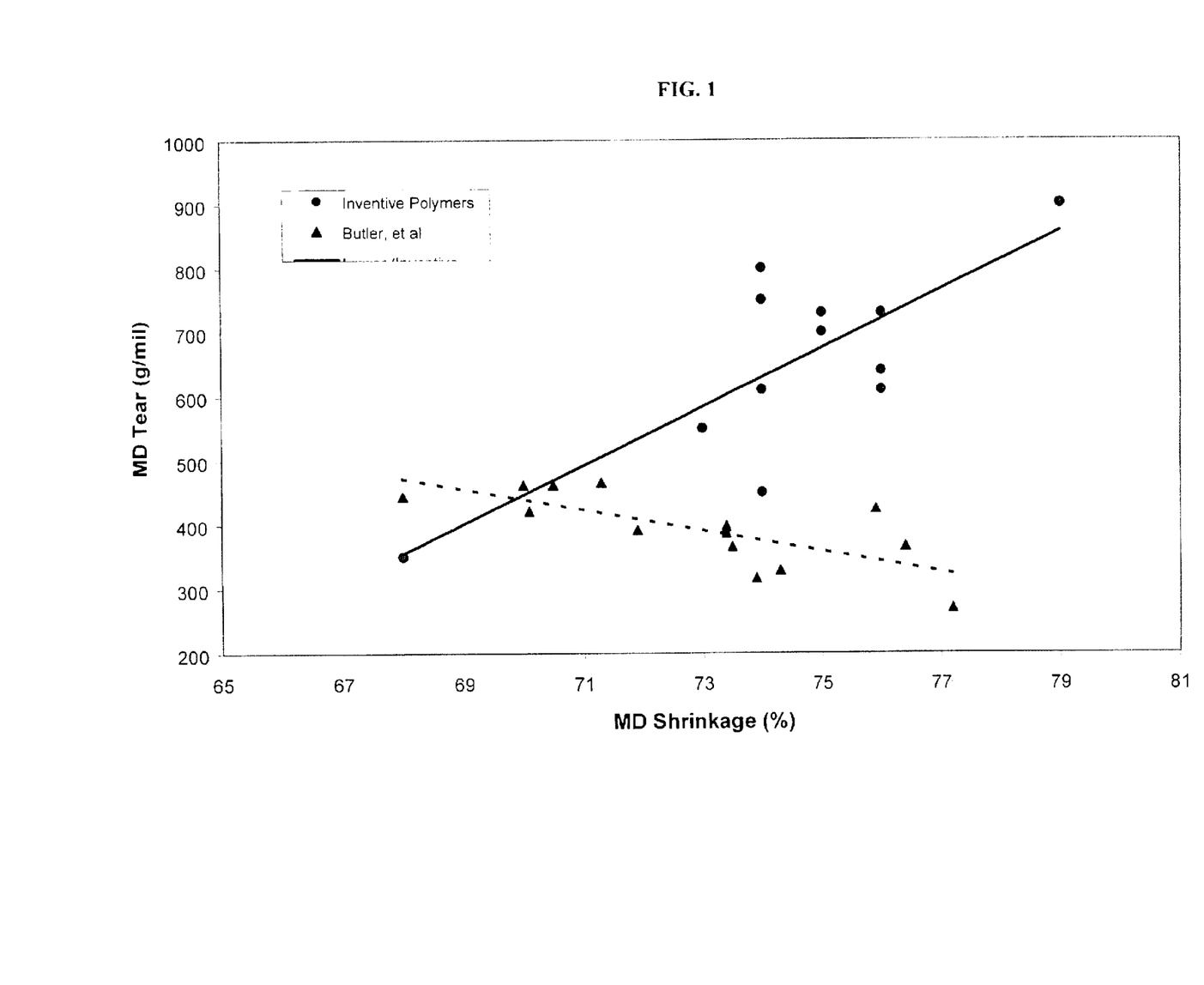
FIG. 1 shows data plotted as MD tear versus MD shrinkage. The film data from embodiments of the present invention are plotted as well as the data from *Polymer Engineering and Science*, mid-October 1994, vol. 34, No. 19 for comparison.

In certain embodiments of our invention, films having a unique balance of MD and TD tear, and/or a simultaneously increasing MD tear with increasing MD shrinkage are contemplated.

Following is a detailed description of certain combinations of polyethylene manufacturing techniques, the use of such polyethylenes so made into films, and the fabrication of these films into useful articles such as trash bags or heavy duty shipping sacks, and use of these articles. Those skilled in the art will appreciate that numerous modifications to these embodiments may be made without departing from the scope of our invention. For example, while certain specific film extrusion techniques using certain polyethylenes are discussed and exemplified, other polyethylenes and extrusion parameters are also contemplated. Additionally, while trash bags and heavy duty shipping sacks are among the uses for embodiments of our inventive films, other uses are also contemplated.

To the extent that this description is specific, it is solely for the purpose of illustrating certain embodiments of the invention and should not be taken as limiting the present inventive concepts to these specific embodiments.

The film of the invention may have a total thickness ranging from ≧0.1, or ≧0.2, or ≧0.3 mils, (≧2.5, or ≧5.1, or ≧7.6 microns) or ≦3 or ≦2.5, or ≦2, or ≦1.5, or ≦1, or ≦0.8, or ≦0.75, or ≦0.6 mils (≦76 or ≦64, or ≦51, or ≦38, or ≦25, or ≦20, or ≦19, or ≦15 microns.

Catalyst Components and Catalyst Systems

Embodiments of our invention include use of a hafnium transition metal metallocene-type catalyst system as described in U.S. Pat. No. 6,242,545 and/or U.S. Pat. No. 6,248,845, hereby incorporated by reference. The techniques for catalyst preparation are included in these documents and the techniques are also exemplified by Example 1 herein.

Additionally, in another embodiment, the method of the invention uses a polymerization catalyst in a supported form, for example deposited on, bonded to, contacted with, or incorporated within, adsorbed or absorbed in, or on, a support or carrier. In another embodiment, the metallocene is introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g. Kaydo® or Drakol®) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable. Such techniques are also exemplified by Example 23 herein.

Polymerization Process of the Invention

The substituted bulky ligand hafnium transition metal metallocene-type catalyst compounds and catalyst systems discussed above are suited for the polymerization of monomers, and optionally one or more comonomers, in any polymerization process, solution phase, gas phase or slurry phase.

In an embodiment, our invention is directed toward the solution, slurry or gas phase polymerization or copolymerization reactions involving the polymerization of one or more of the monomers having from 2 to 30 carbon atoms, or 2–12 carbon atoms, or 2 to 8 carbon atoms. The invention is well suited to the copolymerization reactions involving the polymerization of one or more of the monomers, for example alpha-olefin monomers of ethylene, propylene, butene-1, pentene-1, 4-methyl-pentene-1, hexene-1, octene-1, decene-1, and cyclic olefins such as cyclopentene, and styrene or a combination thereof. Other monomers can include polar vinyl monomers, diolefins such as dienes, polyenes, norbornene, norbornadiene, acetylene and aldehyde monomers. Generally a copolymer of ethylene is produced.

In another embodiment, the process of the invention relates to the polymerization of ethylene and at least one comonomer having from 4 to 8 carbon atoms. The comonomers may be butene-1, 4-methyl-1-pentene, hexene-1 and octene-1.

Typically in a gas phase polymerization process a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. The reactor pressure may vary from 100 psig (680 kPag)-500 psig (3448 kPag), or in the range of from 200 psig (1379 kPag)-400 psig (2759 kPag), or in the range of from 250 psig (1724 kPag)-350 psig (2414 kPag). The reactor temperature may vary between 60° C.–120° C., or 60° C.–115° C., or in the range of from 70° C.–110° C., or in the range of from 70° C.–95° C., or 70–90° C. The productivity of the catalyst or catalyst system is influenced by the main monomer partial pressure. The mole percent of the main monomer, ethylene, is from 25–90 mole percent, or 50–90 mole percent, or 70–85 mole percent, and the monomer partial pressure is in the range of from 75 psia (517 kPa)-300 psia (2069 kPa), or 100–275 psia (689–1894 kPa), or 150–265 psia (1034–1826 kPa), or 200–250 psia (1378–1722 kPa), which are typical conditions in a gas phase polymerization process.

The settled bulk density for the polymers produced by the process of invention are in the range of from 10–35 lb/ft$^3$ (160–561 kg/m$^3$), or from 12–35 lb/ft$^3$ (193–561 kg/m$^3$), or from 14–32 lb/ft$^3$ (224–513 kg/m$^3$), or from 15–30 lb/ft$^3$ (240–481 kg/m$^3$).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

One process embodiment of the invention is a process, a slurry or gas phase process, or a gas phase process, operated in the substantial absence of or essentially free of any scavengers, such as triethylaluminum, trimethylaluminum, triisobutylaluminum and tri-n-hexylaluminum and diethyl aluminum chloride and the like. This process is described in PCT publication WO 96/08520, which is herein fully incorporated by reference.

A slurry polymerization process generally uses pressures in the range of 1 to 50 atmospheres and even greater and temperatures in the range of 0° C. to 200° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, ethylbenzene or xylene. The medium employed should be liquid under the conditions of polymerization and relatively inert. Hexane or isobutane medium may be employed.

In one embodiment a polymerization technique of the invention is referred to as a particle form, or slurry process where the temperature is kept below the temperature at which the polymer goes into solution. Such technique is well known in the art, see for instance U.S. Pat. No. 3,248,179 which is fully incorporated herein by reference. The temperature in the particle form process is within the range of 185° F. (85° C.) to 230° F. (110° C.). Two polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In one embodiment the reactor utilized in the present invention is capable of producing greater than 500 lbs/hr (227 Kg/hr) to 200,000 lbs/hr (90,900 Kg/hr)or higher of polymer, or greater than 1000 lbs/hr (455 Kg/hr), or greater than 10,000 lbs/hr (4540 Kg/hr), or greater than 25,000 lbs/hr (11,300 Kg/hr), or greater than 35,000 lbs/hr (15,900 Kg/hr), or greater than 50,000 lbs/hr (22,700 Kg/hr) or greater than 65,000 lbs/hr (29,000 Kg/hr) to greater than 100,000 lbs/hr (45,500 Kg/hr).

Polymer Product

The polymers used by this invention typically have a density in the range of from 0.86 g/cc–0.97 g/cc, or in the range of from 0.88 g/cc–0.965 g/cc, or in the range of from 0.900 g/cc–0.96 g/cc, or in the range of from 0.905 g/cc–0.95 g/cc, or in the range from 0.910 g/cc–0.940 g/cc, or greater than 0.910 g/cc, or greater than 0.915 g/cc. Polyethylenes in 0.915–0.940 g/cc generally are considered LLDPE. The polymers of the invention typically have a molecular weight distribution, a weight average molecular weight to number average molecular weight ($M_w/M_n$) of 2.5–7, or 2.7–6, or 2.8–5 Also, the polymers of the invention typically have a broad, polymodal composition distribution (CDBI), generally $\leq$55%, or $\leq$50%, or $\leq$45%, or $\leq$40% as determined by CRYSTAF. In another embodiment, the polymers produced by the process of the invention, particularly in a slurry and gas phase process, contain less than 5 ppm hafnium, generally less than 2 ppm hafnium, or less than 1.5 ppm hafnium, or less than 1 ppm hafnium. Additionally, we contemplate that polyethylenes of embodiments of our invention will have small to no amounts of titanium, $\leq$5 ppm, or $\leq$3 ppm, or $\leq$1 ppm, or zero detectable by current analytical techniques.

Polymers used to make the film of the invention are also useful in other forming operations such as sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

In one embodiment of this invention, the polymerization product is a linear low-density polyethylene (LLDPE) resin produced by polymerization of ethylene and an alpha-olefin comonomer, or hexene-1, or octene-1, to the extent of an incorporated content of alpha-olefin comonomer of from 1 to 5 mole %, for a polymer density of $\geq$0.915 g/cc and a polymer weight average molecular weight $\geq$25,000 and such ethylene alpha-olefin copolymer is produced with a catalyst system the hafnocene component of which is at least 95 mole %, or greater of all transition metal compound component. In another embodiment of this invention, the LLDPE resins so produced by a catalyst system of this invention is thereafter converted into a film article.

Film Extrusion and Film Properties

The LLDPE resins used in the invention are more easily extruded into film products by cast or blown film processing techniques with lower motor load, higher throughput and/or reduced head pressure as compared to EXCEED™ resins (available from ExxonMobil Chemical Co.) of comparable melt index, comonomer type and density. Such LLDPE resins have, for a comparable MI, a higher weight average molecular weight and a broader MWD than does an EXCEED™ resin. The improvement in the balance of tear properties can be expressed as a ratio of MD to TD tear (Elmendorf). For embodiments of our invention, this ratio will generally be $\geq$0.9, or $\geq$1.0, or $\geq$1.1, or $\geq$1.2, or $\geq$1.3. In another embodiment, MD tear values of $\geq$350 g/mil, or $\geq$400 g/mil, or $\geq$450 g/mil or $\geq$500 g/mil are contemplated. Intrinsic tear, determined by using the same test as both MD and TD tear, but prepared by compression molding a plaque, is generally believed to be greater than MD tear for LLDPE materials. However, in embodiments of our invention, the intrinsic tear divided by Elmendorf MD tear will be $\geq$1, or ≧1.1, or ≧1.2, or ≧1.4, or ≧1.6. In other embodiments, the dart drop impact resistance (dart) will be ≧500 g/mil (≧500 g/0.254 mm), in other embodiments this dart will be combined with the excellent MD tear value. In other embodiments, processing parameters used during the manufacture of film can be used to improve the physical properties, especially MD tear. It is known that parameters such as melt temperature (extrusion), die gap, blow-up ratio (BUR), and final film gauge, can influence film properties. Draw down ratio (DDR) is defined as:

$$DDR = \frac{die\ gap}{final\ film\ in\ thickness \times BUR}$$

The residual stresses put into the film as a result of these extrusion variables, can be correlated with shrinkage measurements. Typically, there is a direct relationship between shrinkage and DDR, and an inverse relationship between shrinkage and MD tear. In embodiments of our invention, we find a direct relationship between shrinkage and DDR, but contrary to prior art and unexpectedly and surprisingly, we find a direct relationship between MD tear and MD shrinkage.

In such embodiments, the MD tear will be ≧500 g/mil, or ≧550 g/mil and concurrently, the MD shrinkage will be ≧70%, or ≧75%.

Additionally, while some physical property improvements may be seen on thick film, in excess of 3 mils, using other polyethylenes and formed without using the film extrusion techniques outlined herein, we generally contemplate that commercial films, utilizing the presently disclosed polyethylenes and extrusion techniques, and articles made therefrom, will have a thickness of ≦3 mils, or ≦2 mils or ≦1 mil, or ≧0.1 mil or ≧0.2 mils. Property improvements can also be seen at low, generally unacceptable, non-commercial extrusion rates. The film properties of embodiments of our invention however, will generally be attainable at ≧8, or ≧10 or ≧12 or ≧14, or ≧16, or ≧18 or more pounds of polymer output, per hour, per inch of die circumference.

LLDPEs as described above, with hexene as comonomer will exhibit a weight average molecular weight of 25,000–200,000 at corresponding MI values that range between 10–0.1 MI, and the weight average molecular weight ranges from 80,000–150,000 within which range the melt index respectively ranges from a value of 3–0.5. For such LLDPE resins, the melt index ratio (MIR defined by $I_{21}/I_2$ described herein) is ≧20 or ≦40, and or ≧25 or ≦35.

Typical die gaps range from 30–120 mils, or 60–110 mils. Melt temperatures range from 350–550° F., or 390–450° F. Draw down ratios range from 20–50, or around 30–40.

We contemplate that certain extrusion conditions may be used in an effective amount, in combination or singly, to achieve one or more of the physical properties discussed herein. By effective amount we intend that with the guidance given herein, coupled with ordinary skill in the extrusion art, the skilled person could select conditions to so achieve these properties.

| Definitions and Testing Protocols | | |
|---|---|---|
| Melt Index (MI) | g/10 min. | ASTM D-1238, condition E @ 190° C. |
| Density | g/cc | ASTM-D-1238 |
| Dart Drop Impact $F_{50}$ | g and g/mil | ASTM D-1709 |
| Elmendorf Tear | g (g/mil) | ASTM D-1922 |
| Secant Modulus (1%) | psi | ASTM D-790A |
| Shrinkage | % | Univation Test Procedure* |

*Circular specimens for shrinkage measurement were cut from the film using a 100 mm die. The samples are marked in their respective directions. The samples were dusted with talc and placed on a pre-heated, talc-covered tile. The sample is then heated using a heat gun (model HG-501A) for approximately 10–45 seconds, or until the dimensional change ceased. An average of three specimens was reported. Note, in the tables which follow, a negative shrinkage number indicates expansion of a dimension after heating, compared to its pre heating dimension.

Melt strength was measured at 190° C. using a commercial instrument (Rheotester 1000) from Goettfert, Germany.

CRYSTAF data was obtained using a commercial instrument (Model 200) from PolymerChar S. A., Valencia, Spain. Using a technique outlined in Macromol. Mater.Eng. 279, 46–51 (2000).

MWD, or polydispersity, is a well-known characteristic of polymers. MWD is generally described as the ratio of the weight average molecular weight (Mw) to the number average molecular weight (Mn). The ratio of Mw/Mn can be measured by gel permeation chromatography (GPC) techniques, or indirectly, by measuring the ratio of $I_{21}$ to $I_2$ (melt index) as described in ASTM D-1238-F and ASTM D-1238-E respectively.

EXAMPLES

Example 1

Catalyst Preparation bis (n-propylcyclopentadienyl) hafnium dichloride metallocene was synthesized according to procedures well-known in the art. Methylaluminoxane (MAO) 1140 cc of a 30 wt % solution in toluene (obtained from Albemarle Corporation, Baton Rouge, La.) was added to a clean, dry 2 gallon vessel and stirred at 60 rpm and 80° F. for 15 min. An additional 1500 cc of toluene is added with stirring. The metallocene (21.6 g) was dissolved in 250 cc toluene and the transfer vessel was rinsed with an additional 150 cc of toluene. The metallocene/MAO mixture was stirred at 120 rpm for 1 hour. Next, 850 g of silica, Davison 948 (W. R. Grace, Davison Chemical Division, Baltimore, Md., dehydrated at 600° C.) was added and stirred for 55 min. The catalyst was then dried at 155° F. for 10 hours while being stirred at 30 rpm.

Examples 2–19

Polymer Production

Examples 2–19 are polymerized using the catalyst in Example 1 according to the conditions listed in Table I.

Granular resin was dry-blended with 500 ppm Irganox® (IR) (available from Ciba-Geigy) 1076, 2000 ppm IR168 and 800 ppm FX5920A (processing aid from Dynamar) using a double-cone blender. Some of the resins as shown in Table contained Eurucamide and or ABT 2500 as slip and anti-block respectively. A white masterbatch was also added to some examples a mixture of 50% TiO2 in a polyethylene carrier. Pelletizing of the resins was carried out on a Farrel continuous mixer (4LMSD) using a specific energy input of 0.125 hp-h/lb. Output rate was 500 lb/h and melt temperature was 226° C.

Film Production

Examples 2–19 and comparative examples 20–22 were extruded into film using a 2.5" Battenfield Gloucester blown film line (30:1 L:D) equipped with a 6" oscillating die and a Future Design® air ring. Output rate was 188 lb./hour (10 lb./hour/inch die circumference). A standard "hump" temperature profile is used (where BZ is barrel zone and the temperatures are in ° F.):

BZ1=310/BZ2=400/BZ3=380/BZ4=350/BZ5=350/Adapter=390/Die=390° F.

Example 23

Catalyst Preparation bis (n-propylcyclopentadienyl) hafnium dichloride metallocene was synthesized according to procedures well-known in the art. Methylaluminoxane on silica (MOS) was obtained from Univation Technologies commercial catalyst facility at Mt. Belvieu, Tex.

In a glove box, 704 grams of MOS (MAO on Silica) was measured into a 3L beaker. 3486 grams of de-gassed Witco Kaydol® mineral oil was added to the MOS and mixed with a Braun hand mixer until evenly dispersed (~5 minutes). Then 12.05 grams of bis (n-propylcyclopentadienyl) hafnium dichloride metallocene was added and mixed for another 10 minutes. The catalyst was formulated at a 118:1 Al:Hf molar ratio and 0.65 wt % hafnium transition metal in the solids. The final slurry concentration was 17 wt % solids in oil. The metallocene/MOS/oil slurry was transferred from a beaker to the catalyst lab mix tank via a 2 liter Hoke bomb. The metallocene/MOS/oil slurry was mixed for approximately 19 hours in the mix tank, then the slurry was off-loaded to a 2L bomb.

The mineral oil was de-gassed in 3-gallon batches. The 3-gallon, round bottom flask consists of an agitator, a sintered glass sparging tube, a vacuum source, and a heat source. Vacuum was pulled on the flask while the oil was sparged with high purity nitrogen. During this time, the oil was heated to 110° C. The entire process lasts for 8–14 hours.

Examples 24–26

Polymer Production

Examples 24–26 were polymerized in a nominal 14" diameter fluidized bed reactor using the catalyst in Example 23 according to the conditions listed in Table 1. The slurry catalyst was transferred from the 2 liter Hoke bomb into an inerted agitated reservoir. The material was fed to the reactor using a syringe feeder through a ³/₁₆" injection tube. A 4 lb./hr nitrogen feed to the injection tube facilitated proper catalyst dispersion into the reactor. Reactor gas composition was monitored by GC and maintained by adjusting monomer and inert feed rates and reactor vent as needed. Resin was discharged from the reactor to a fiberpack in batch-wise fashion to maintain a bed weight of approximately 110 lbs. A wet nitrogen purge was fed to the fiberpack at approximately 5–10 lb/hr.

The granular resin was dry-blended with 500 ppm IR1076, 2000 ppm IR168 and 800 ppm FX5920A using a double-cone blender. Pelletizing of the resins was carried out on a Werner & Pfleiderer ZSK 57 mm twin screw extruder. Output rate was 150 lb/h and melt temperature ranged from 205–219° C. depending on melt index of the resin. Pellet count was 34–36 pellets/gram.

Film Production

Examples 24–26 and comparative examples 27–28 were extruded into film using a 2.5" Battenfield Gloucester blown film line (30:1 L:D) equipped with a 6" oscillating die and a Future Design air ring. Output rate was 188 lb/h (10 lb/h/in die circumference). A standard "hump" temperature profile was used:

BZ1=310/BZ2=400/BZ3=380/BZ4=350/BZ5=350/Adapter=390/Die=390° F.

Film Properties

Film properties are shown in Table II for Examples 2–19 and Comparative Examples 20–22. The Comparative Examples are metallocene catalyst produced polyethylenes, Example 20 is Exceed® 1018 CA and Comparative Example 21 is Exceed ECD 313. Comparative Example 22 is a commercial Z-N LLDPE, NTX 0-95, all available from ExxonMobil Chemical Company. Table clearly shows that for Examples 2–19, the MD tear/TD tear ratios are all greater than 0.9, with an absolute MD tear value of at least 350 g/mil.

Similarly, in Table III, Examples 24–26, the MD/TD ratios are all above 1.0, with dart values in excess of 500 g/mil, in contrast to the Comparative Examples 27–28. Comparative Example 27 is a commercially available mLLDPE available from ExxonMobil Chemical Company (same grade as Comparative Example 20). Comparative Example 28 is a commercially available mLLDPE available from Dow Chemical Company, Elite® 5400.

TABLE I

| Examples | 2–19 | 24 | 25 | 26 |
|---|---|---|---|---|
| Production Rate (lb/h) | 150 | 27 | 31 | 40 |
| Hydrogen (ppm) | 293 | 311 | 300 | 301 |
| C2 partial pressure (psia) | 252 | 234 | 233 | 240 |
| C6/C2 concentration ratio | 0.015 | 0.021 | 0.023 | 0.022 |
| Temperature (deg C.) | 76.7 | 76.3 | 76.3 | 76.3 |
| Residence Time (h) | 4.1 | 3.9 | 3.4 | 2.7 |

TABLE II

| | Ex. 2 | #3 | Ex #4 | Ex #5 | Ex #6 | Ex. #7 | Ex #8 | Ex #9 |
|---|---|---|---|---|---|---|---|---|
| Die Gap | 60 | 60 | 60 | 60 | 60 | 45 | 90 | 60 |
| Melt Temperature (° F.) | 396 | 397 | 432 | 396 | 396 | 396 | 395 | 392 |
| Inner Die Temperature (° F.) | 395 | 394 | 423 | 390 | 390 | 396 | 391 | 390 |
| Output (lb/h) | 189 | 190 | 191 | 188 | 188 | 189 | 189 | 151 |
| BUR | 2.5 | 2.5 | 2.5 | 2.0 | 3.0 | 2.5 | 2.5 | 2.5 |
| FLH | 18 | 21 | 29 | 21 | 18 | 21 | 19 | 14 |
| Comments | | | | | | | | |

TABLE II-continued

| CHARACTERIZATION | | | | | | | | |
|---|---|---|---|---|---|---|---|---|
| MI (I2) | 0.79 | | | | | | | |
| HLMI (I21) | 22.9 | | | | | | | |
| MIR (I21/I2) | 29.0 | | | | | | | |
| Resin Density (g/cc) | 0.9195 | | | | | | | |
| Melt Strength (cN) | 5.4 | | | | | | | |
| 1% Secant Modulus (psi) | | | | | | | | |
| SEC_MOD_MD | 28,280 | 29,370 | 28,590 | 28,900 | 27,460 | 28,140 | 29,280 | 28,170 |
| SEC_MOD_TD | 36,210 | 36,540 | 35,080 | 40,620 | 33,030 | 36,590 | 36,460 | 35,320 |
| Elmendorf Tear | | | | | | | | |
| ELM_TEAR_MD (g/ml) | 730 | 750 | 350 | 900 | 450 | 610 | 730 | 550 |
| ELM_TEAR_TD (g/ml) | 590 | 600 | 540 | 760 | 510 | 580 | 650 | 580 |
| MD/TD Tear | 1.24 | 1.25 | 0.65 | 1.18 | 0.88 | 1.05 | 1.12 | 0.95 |
| Dart Drop (Method A) | | | | | | | | |
| (g) | 520 | 420 (570, 300) | 680 (650) | 170 | 690 | 610 | 250 | 470 |
| (g/mil) | 710 | 550 (760, 400) | 910 (880) | 230 | 1030 | 830 | 330 | 620 |
| Gauge Mic (mils) | 0.73 | 0.75 | 0.74 | 0.72 | 0.67 | 0.73 | 0.74 | 0.75 |
| Shrink (%) | | | | | | | | |
| MD | 75 | 74 | 68 | 79 | 74 | 74 | 76 | 73 |
| TD | −20 | −24 | −21 | −45 | −9 | −24 | −27 | −17 |

| | Ex. #10 | Ex #11 | Ex #12 | Ex. #13 | Ex #14 | Ex #15 | Ex. #16 | Ex #17 |
|---|---|---|---|---|---|---|---|---|
| Die Gap | 60 | 60 | 60 | 60 | 60 | 60 | 60 | 60 |
| Melt Temperature (° F.) | 400 | 397 | 397 | 397 | 396 | 396 | 396 | 396 |
| Inner Die Temperature (° F.) | 391 | 402 | 400 | 399 | 392 | 396 | 397 | 398 |
| Output (lb/h) | 225 | 187 | 191 | 188 | 187 | 190 | 190 | 188 |
| BUR | 2.5 | 2.5 | 2.5 | 2.5 | 2.5 | 2.5 | 2.5 | 2.5 |
| FLH | 23 | 19 | 19 | 19 | 19 | 19 | 19 | 19 |
| Comments | | | 900 ppm slip 4000 ppm ABT2500 | 900 ppm slip 4000 ppm ABT2500 3% white MB | 900 ppm slip no A/B | 900 ppm slip 2500 ppm ABT2500 | 900 ppm slip 4000 ppm ABT2500 | 3% white MB 900 ppm slip 4000 ppm ABT2500 |
| CHARACTERIZATION | | | | | | | | |
| MI (I2) | | | | | 0.79 | | | |
| HLMI (I21) | | | | | 22.9 | | | |
| MIR (I21/I2) | | | | | 29.0 | | | |
| Resin Density (g/cc) | | | | | 0.9196 | | | |
| Melt Strength (cN) | | | | | 5.6 | | | |
| 1% Secant Modulus (psi) | | | | | | | | |
| SEC_MOD_MD | 28,960 | 28,660 | 28,130 | 27,570 | 27,860 | 25,890 | 26,170 | 26,040 |
| SEC_MOD_TD | 36,740 | 36,870 | 33,510 | 34,560 | 33,740 | 29,640 | 29,683 | 30,070 |
| Elmendorf Tear | | | | | | | | |
| ELM_TEAR_MD (g/ml) | 800 | 700 | 640 | 610 | 720 | 660 | 710 | 680 |
| ELM_TEAR_TD (g/ml) | 610 | | 640 | 660 | 610 | 710 | 730 | 690 |
| MD/TD Tear | 1.31 | | 1.00 | 0.92 | 1.18 | 0.93 | 0.97 | 0.99 |
| Dart Drop (Method A) | | | | | | | | |
| (g) | 350 | 350 | 410 | 360 | 330 (380) | 540 | 470 | 320 |
| (g/mil) | 490 | 460 | 540 | 480 | 460 (520) | 700 | 590 | 430 |
| Gauge Mic (mils) | 0.72 | 0.75 | 0.76 | 0.75 | 0.73 | 0.78 | 0.8 | 0.74 |
| Shrink (%) | | | | | | | | |
| MD | 74 | 75 | 76 | 76 | 71 | 74 | 75 | 76 |
| TD | −26 | −28 | 27 | −23 | −23 | −25 | −25 | −24 |

| | Ex #18 | Ex. #19 | Cmp #20 | Cmp #21 | Cmp #22 |
|---|---|---|---|---|---|
| Die Gap | 60 | 60 | 60 | 60 | 60 |
| Melt Temperature (° F.) | 396 | 395 | 401 | 397 | 432 |
| Inner Die Temperature (° F.) | 398 | 397 | 406 | 400 | 422 |
| Output (lb/h) | 188 | 188 | 190 | 188 | 186 |
| BUR | 2.5 | 2.5 | 2.5 | 2.5 | 2.5 |
| FLH | 19 | 19 | 24 | 24 | 25 |
| Comments | 3% white MB 900 ppm slip 4000 ppm | 900 ppm slip 5000 ppm ABT2500 | no slip no AB | 450 ppm slip 4500 ppm AB | 1400 ppm slip 8000 ppm AB |

TABLE II-continued

|  | ABT2500 |  |  |  |  |
|---|---|---|---|---|---|
| CHARACTERIZATION |  |  |  |  |  |
| MI (I2) |  |  | 0.96 | 1.16 | 1.00 |
| HLMI (I21) |  |  | 15.6 | 18.7 | 25.5 |
| MIR (I21/I2) |  |  | 16.3 | 16.1 | 25.5 |
| Resin Density (g/cc) |  |  | 0.9197 | 0.9218 | 0.9226 |
| Melt Strength (cN) |  |  | 3.7 | 3.7 | 4.6 |
| 1% Secant Modulus (psi) |  |  |  |  |  |
| SEC_MOD_MD | 26,500 | 26,810 | 24740 | 22290 | 23510 |
| SEC_MOD_TD | 30,310 | 29,670 | 27450 | 24210 | 25570 |
| Elmendorf Tear |  |  |  |  |  |
| ELM_TEAR_MD (g/ml) | 670 | 650 | 310 | 250 | 400 |
| ELM_TEAR_TD (g/ml) | 830 | 710 | 500 | 420 | 760 |
| MD/TD Tear | 0.81 | 0.92 | 0.62 | 0.60 | 0.53 |
| Dart Drop (Method A) |  |  |  |  |  |
| (g) | 270 | 520 | 390 | 490 | 350 |
| (g/mil) | 450 | 660 | 530 | 630 | 460 |
| Gauge Mic (mils) | 0.59 | 0.79 | 0.73 | 0.78 | 0.77 |
| Shrink (%) |  |  |  |  |  |
| MD | 78 | 74 | 56 | 54 | 62 |
| TD | −25 | −23 | −14 | −11 | −16 |

TABLE III

|  | Example #24 | Example #25 | Example #26 | Comp. Ex. #27 | Comp. Ex. #28 |
|---|---|---|---|---|---|
| Die Gap | 60 | 60 | 60 | 60 | 60 |
| Melt Temperature (° F.) | 400 | 403 | 403 | 403 | 397 |
| Inner Die Temperature (° F.) | 402 | 406 | 394 | 401 | 396 |
| Output (lb/h) | 190 | 188 | 190 | 192 | 188 |
| BUR | 2.5 | 2.5 | 2.5 | 2.5 | 2.5 |
| FLH | 20 | 20 | 23 | 25 | 22 |
| CHARACTERIZATION |  |  |  |  |  |
| MI (I2) | 0.82 | 0.6 | 0.97 | 1.04 | 1.03 |
| HLMI (I21) | 23.2 | 18.16 | 29.4 | 17.2 | 29.8 |
| MIR (I21/I2) | 28.3 | 30.3 | 30.3 | 16.5 | 28.9 |
| Melt Strength (cN) | 5.5 | 6.8 | 5.4 |  |  |
| Resin Density (g/cc) | 0.9194 | 0.9165 | 0.9201 | 0.9184 | 0.9169 |
| 1% Secant Modulus (psi) |  |  |  |  |  |
| SEC_MOD_MD | 31130 | 26740 | 31180 | 24920 | 26240 |
| SEC_MOD_TD | 38180 | 30130 | 39510 | 28010 | 29550 |
| Intrinsic Tear (g/mil) | 320 | 310 | 340 | 350 | 460 |
| MD Tear/Intrinsic Tear | 2.00 | 2.0–2.2 | 1.80 | 0.80 | 1.00 |
| Elmendorf Tear |  |  |  |  |  |
| ELM_TEAR_MD (g/mil) | 640 | 670 (630) | 600 | 280 | 450 |
| ELM_TEAR_TD (g/mil) | 610 | 560 | 580 | 460 | 680 |
| MD/TD ratio | 1.05 | 1.13–1.20 | 1.03 | 0.61 | 0.66 |
| Dart Drop (Method A) |  |  |  |  |  |
| (g) | 480 | 650 | 520 | 480 | 460 |
| (g/mil) | 640 | 890 | 690 | 650 | 620 |
| Gauge Mic (mils) | 0.75 | 0.75 | 0.75 | 0.74 | 0.74 |
| Shrink (%) |  |  |  |  |  |
| MD | 71 | 78 | 67 | 55 | 77 |
| TD | −20 | −22 | −19 | −4 | −26 |

TABLE IV

|  | Example #24 | Example #25 | Example #26 | Comp. Ex. #27 | Comp. Ex. #28 |
|---|---|---|---|---|---|
| CHARACTERIZATION |  |  |  |  |  |
| MI (I2) | 0.82 | 0.6 | 0.97 | 1.04 | 1.03 |
| MIR (I21/I2) | 28.3 | 30.3 | 30.3 | 16.5 | 28.9 |
| Melt Strength (cN) | 5.5 | 6.8 | 5.4 |  |  |
| Resin Density (g/cc) | 0.9194 | 0.9165 | 0.9201 | 0.9184 | 0.9169 |

TABLE IV-continued

|  | Example #24 | Example #25 | Example #26 | Comp. Ex. #27 | Comp. Ex. #28 |
|---|---|---|---|---|---|
| PROCESS DATA |  |  |  |  |  |
| Output (lb/h) | 190 | 188 | 190 | 192 | 188 |
| ESO (lb/HP-h) | 10.96 | 10.32 | 11.79 | 10.44 | 11.92 |
| Head Pressure (psi) | 3710 | 4160 | 3470 | 3820 | 3340 |
| Die Pressure (psi) | 2540 | 2900 | 2320 | 2520 | 2240 |
| Motor Load (amps) | 68.3 | 71.4 | 64.0 | 72.4 | 63.1 |
| Inner Die Temperature (° F.) | 402 | 406 | 394 | 401 | 396 |
| Melt Temperature (° F.) | 400 | 403 | 403 | 403 | 397 |
| Screw Speed (rpm) | 59.7 | 59.9 | 59.7 | 59.7 | 58.9 |
| Line Speed (fpm) | 235 | 233 | 232 | 232 | 229 |
| Gauge (mils) | 0.75 | 0.75 | 0.75 | .76 | 0.75 |
| FLH (in) | 20 | 20 | 23 | 25 | 22 |
| Air (%) | 76.7 | 77.9 | 63.0 | 63.0 | 63.2 |

Although the present invention has been described in considerable detail with reference to certain embodiments thereof, other embodiments are possible. For example, while blown films with an improved machine direction Elmendorf tear is exemplified, other properties and film improvements are contemplated. Therefore, the spirit and scope of the appended claims should not be limited to the description of the embodiments contained herein.

We claim:

1. A film comprising a LLDPE, wherein LLDPE is produced in a gas phase process utilizing a hafnium transition metal metallocene-type catalyst system; wherein the film has a ratio of MD tear to TD tear, both determined by ASTM D-1922, of $\geq 0.9$; wherein the MD tear of the film increases with increasing MD shrinkage.

2. The film of claim 1, wherein the film properties are attainable at $\geq 10$ pounds of polymer composition output per hour per inch of die circumference.

3. The film of claim 1, wherein the film properties are attainable at $\geq 12$ pounds of polymer composition output per hour per inch of die circumference.

4. The film of claim 1, wherein said ratio is $\geq 1.0$.

5. The film of claim 1, wherein said ratio is $\geq 1.1$.

6. The film of claim 1, wherein said ratio is $\geq 1.2$.

7. The film of claim 1, wherein the film possesses a dart drop impact, as determined by ASTM D-1709, $\geq 500$ g/mil.

8. The film of claims 1, 4, 5, 6, or 7, wherein said film has an MD tear $\geq 350$ g/mil, and a dart drop impact, as determined by ASTM D-1709, $\geq 500$ g/mil.

9. The film of claim 8, wherein said film has an MD tear $\geq 400$ g/mil.

10. The film of claim 8, wherein said film has an MD tear $\geq 450$ g/mil.

11. The film of claim 8, wherein said film has an MD tear $\geq 500$ g/mil.

12. A film comprising a linear low density ethylene (LLDPE), wherein said film has a ratio of MD tear to TD tear, both determined by ASTM D 1922, of $\geq 9$; and wherein the LLDPE is produced in a gas phase process by contacting ethylene, at least one comonomer having from 4 to 8 carbon atoms, and a hafnium transition metal metallocene-type catalyst system; wherein the MD tear of the film increases with increasing MD shrinkage.

13. The film of claim 1, wherein said ratio is $\geq 1.0$.

14. The film of claim 1, wherein said ratio is $\geq 1.1$.

15. The film of claim 1, wherein said ratio is 1.2.

16. The film of claim 1, wherein said ratio is 1.3.

17. The film of claims 12, 13, 14. 15, or 16, wherein said film has an MD tear $\geq 350$ g/mil, and a dart drop impact, as determined by ASTM D-1709, $\geq 500$ g/mil.

18. The film of claim 17, wherein said film has an MD tear $\geq 450$ g/mil.

19. The film of claim 17, wherein said film has an MD tear $\geq 500$ g/mil.

20. A process for producing the film of claims 12, 13, 14, 15, or 16, comprising extruding an LLDPE at a temperature effective to produce a film having an MD tear $\geq 350$ g/mil.

21. The process of claim 20, wherein said film has an MD tear $\geq 400$ g/mil.

22. The process of claim 20, wherein said film has an MD tear $\geq 450$ g/mil.

23. The process of claim 20, wherein said film has an MD tear $\geq 500$ g/mil.

24. A process for producing the film of claims 12, 13, 14, 15, or 16, comprising extruding said film of an LLDPE at a draw down ratio effective to produce a film having an MD tear $\geq 350$ g/mil.

25. The process of claim 24, wherein said film has an MD tear $\geq 400$ g/mil.

26. The process of claim 24, wherein said film has an MD tear $\geq 450$ g/mil.

27. The process of claim 24, wherein said film has an MD tear $\geq 500$ g/mil.

28. A process for producing the film of claims 12, 13, 14, 15, or 16, comprising extruding said film of an LLDPE at one or more of a temperature, or a draw down ratio effective to produce a film having an MD tear $\geq 400$ g/mil.

29. A film made from a polymer composition possessing a density in the range of 0.910 to 0.940 g/cc, and a $M_w/M_n$ value of 2.5 to 7; wherein the polymer composition is produced in a gas phase process utilizing a hafnium transition metal metallocene-type catalyst system; wherein the film has a MD/TD tear ratio $\geq 9$ and wherein the MD tear of the film increases with increasing MD shrinkage.

30. A polyolefin film comprising a linear low density ethylene extruded at a temperature or a draw down ratio effective to form a film having a MD tear to TD tear ratio of $\geq 1.0$; wherein said film has a MD tear $\geq 450$ g/mil and a dart drop impact $\geq 500$ g/mil; and wherein the LLDPE is produced in a gas phase process by contacting ethylene, at least one comonomer having from 4 to 8 carbon atoms, and a hafnium transition metal metallocene-type catalyst system; wherein the MD tear of the film increases with increasing MD shrinkage.

31. The film of claim 30, wherein the temperature ranges from 350 to 550° F.

32. The film of claim 30, wherein the temperature ranges from 390 to 450° F.

33. The film of claim 30, wherein the draw down ratio ranges from 20 to 50.

34. The film of claim 30, wherein the draw down ratio ranges from 30 to 40.

35. A blown film having a balance of physical properties, comprising an LLDPE, wherein said film has a ratio of MD tear to TD tear, as measured by ASTM D 1922, of $\geq 0$ and a MD tear $\geq 400$ g/mil, and a dart drop impact, as measured by ASTM D-1709, $\geq 500$ g/mil; and wherein the LLDPE is produced in a gas phase process by contacting ethylene, at least one comonomer having from 4 to 8 carbon atoms and a hafnium transition metal metallocene-type catalyst system; wherein the MD tear of the film increases with increasing MD shrinkage.

36. A polyethylene film comprising an LLDPE, said film having an MD tear $\geq 500$ g/mil, and a MD tear to TD tear ratio $\geq 1.0$, and a MD shrinkage of $\geq 70\%$; wherein LLDPE is produced in a gas phase process utilizing a hafnium transition metal metallocene-type catalyst system and wherein the MD tear of the film increases with increasing MD shrinkage.

37. The polyethylene film of claim 36, wherein said MD tear is $\geq 550$ g/mil.

38. The polyethylene film of claim 37, wherein said shrinkage is $\geq 75\%$, and wherein said film has a CDBI, as determined by CRYSTAF, $\leq 50\%$, and wherein said LLDPE has an MD tear to intrinsic war ratio $\leq 1.2$.

39. A film comprising a LLDPE having a MD/TD tear ratio $\geq 0.9$, wherein said LLDPE is substantially free of titanium and wherein said LLDPE has a CDBI, as determined by CRYSTAF, of $\geq 45\%$; wherein LLDPE is produced in a gas phase process utilizing a hafnium transition metal metallocene-type catalyst system; wherein the MD tear of the film increases with increasing MD shrinkage.

40. The film of any of claims 12, 30, 35, or 39, wherein the film properties are attainable at $\geq 8$ pounds of polymer per hour per inch of die circumference.

41. The film of claim wherein the film properties are attainable at $\geq 10$ pounds of polymer per hour per inch of die circumference.

42. The film of claim 40, wherein the film properties are attainable at $\geq 12$ pounds of polymer per hour per inch of die circumference.

43. The film of claim 28, wherein the melt temperature of the polymer ranges from 350 to 550° F. and the die gaps range from 30 to 120 mils.

44. A film made from a polymer composition possessing a density in the range of 0.910 to 0.940 g/cc, and a $M_w/M_n$ value of 2.5 to 7; and wherein the polymer composition is produced in a gas phase process by contacting ethylene, at least one comonomer having from 4 to 8 carbon atoms and a hafnium transition metal metallocene-type catalyst system; wherein the film has a MD/TD tear ratio $\geq 0.9$ and wherein the MD tear of the film increases with increasing MD shrinkage.

45. The film of claim 44, further possessing a CDBI of $\leq 55\%$.

46. The film of claim 44, further possessing $\leq 5$ ppm titanium.

47. The film of claim 44, the polymer composition comprising ethylene derived units, and 1 to 5 mole % comonomer derived units.

48. The film of claim 47, wherein the comonomner derived units are hexene-1 or octene-1.

49. The film of claim 44, wherein the hafnium component of the catalyst system comprises at least 95 mole % or greater of all the transition metal compounds of the catalyst system.

50. The film of claim 44, wherein the film properties are attainable at $\geq 8$ pounds of polymer composition output per hour per inch of die circumference.

51. The film of claim 44, wherein the film properties are attainable at $\geq 10$ pounds of polymer composition output per hour per inch of die circumference.

52. The film of claim 44, wherein the film properties are attainable at $\geq 12$ pounds of polymer composition output per hour per inch of die circumference.

53. The film of claim 51 or 52, wherein the melt temperature of the polymer composition ranges from 350 to 550° F. and the die gaps range from 30 to 120 mils.

54. The film of claim 44, wherein the hafnium transition metal metallocene-type catalyst system is the product of the combination of a hafnium transition metal metallocene-type catalyst and a presupported activator in oil or a hydrocarbon.

55. The film of claim 44, wherein the film possesses a draw down ratio ranging from 20 to 50.

56. The film of claim 44, wherein the comonomer is hexene-1 and the polymer composition possesses an MI of from 0.1 to 10 dg/min.

57. The film of claims 12, 30, 35, 39, or 44, wherein the catalyst system consists of the hafnium metallocene, an activator and a support.

58. The film of 12, 30, 35, 39, 44, 1, and 29, wherein the MD tear is $\geq 500$ g/mil and the MD shrinkage is $\geq 70\%$.

* * * * *

UNITED STATES PATENT AND TRADEMARK OFFICE
CERTIFICATE OF CORRECTION

| | | |
|---|---|---|
| PATENT NO. | : 6,956,088 B2 | |
| APPLICATION NO. | : 10/199446 | |
| DATED | : October 18, 2005 | |
| INVENTOR(S) | : Farley et al. | |

It is certified that error appears in the above-identified patent and that said Letters Patent is hereby corrected as shown below:

Claim 12, line 53, "ethylene" should read --polyethylene--; Claim 12, line 55, "$\geq 9$" should read -- $\geq .9$--.

Claim 29, line 50, "$\geq 9$" should read -- $\geq .9$--.

Claim 30, line 53, "ethylene" should read --polyethylene--.

Claim 35, line 3, "A blown film" should read -- A film --; Claim 35, line 5, "$\geq 0$" should read -- $\geq 1.0$--.

Claim 38, line 25, "war" should read -- tear --.

Claim 39, line 29, "$\geq 45\%$" should read -- $\leq 45\%$--.

Claim 41, line 36, please insert -- 40 -- after "claim."

Claim 43, line 42, please replace "28" with -- 40 --.

Claim 58, line 44, please insert -- claims -- after "of."

Signed and Sealed this

Twenty-second Day of May, 2007

JON W. DUDAS
*Director of the United States Patent and Trademark Office*